United States Patent [19]

Dinger et al.

[11] Patent Number: 4,548,039
[45] Date of Patent: Oct. 22, 1985

[54] TURBOCHARGED INTERNAL COMBUSTION ENGINE

[75] Inventors: Hans Dinger, Friedrichshafen; Helmut Klotz, Tettnang, both of Fed. Rep. of Germany

[73] Assignee: MTU Friedrichshafen GmbH, Fed. Rep. of Germany

[21] Appl. No.: 68,579

[22] Filed: Aug. 22, 1979

[30] Foreign Application Priority Data

Sep. 7, 1978 [DE] Fed. Rep. of Germany ....... 2838952
Nov. 14, 1978 [DE] Fed. Rep. of Germany ....... 2849302

[51] Int. Cl.[4] .............................................. F02B 37/00
[52] U.S. Cl. ........................................ 60/606; 60/612; 60/605; 60/607
[58] Field of Search ................ 60/605, 606, 612, 607; 123/198 F, 559

[56] References Cited

U.S. PATENT DOCUMENTS

| 2,379,455 | 7/1945 | Prince | 60/606 X |
| 3,103,780 | 9/1963 | Tryhorn | 60/606 X |
| 4,191,152 | 3/1980 | Deutschmann | 123/198 F X |

FOREIGN PATENT DOCUMENTS

| 2719668 | 11/1978 | Fed. Rep. of Germany | 60/605 |
| 2226559 | 11/1974 | France | 60/606 |

Primary Examiner—Michael Koczo
Attorney, Agent, or Firm—Craig and Burns

[57] ABSTRACT

An internal combustion engine with several cylinders, with one or several superchargers, and with an additional compressor-drive by means of compressed gas, in which during partial load of the internal combustion engine, some cylinders operate as engine while the other cylinders which operate in the meantime as compressors, supply compressed gas for the additional compressor-drive of each supercharging aggregate that supplies the cylinder operating as combustion engine with charging air.

25 Claims, 12 Drawing Figures

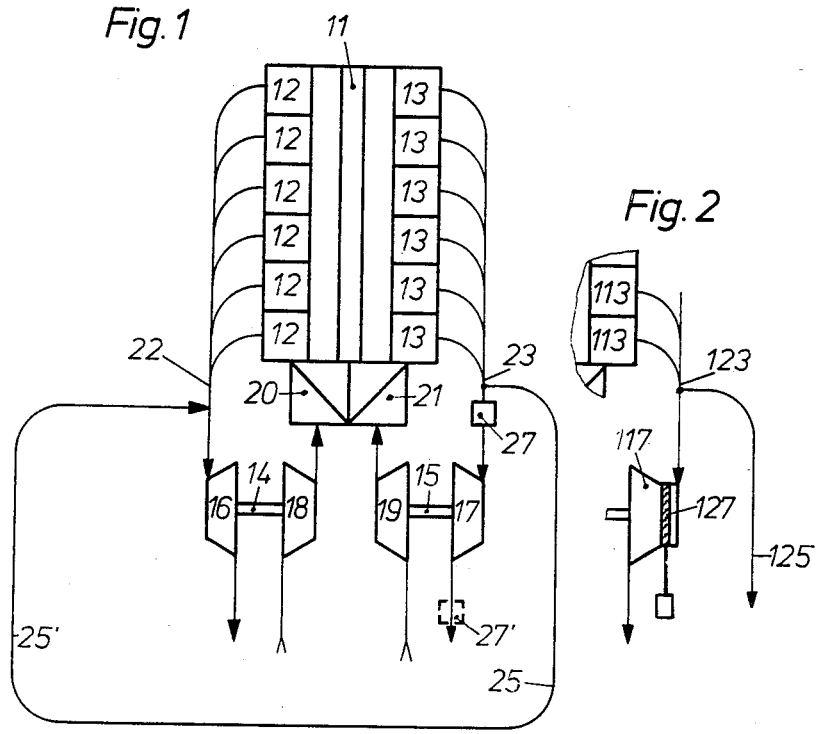
Fig. 1
Fig. 2
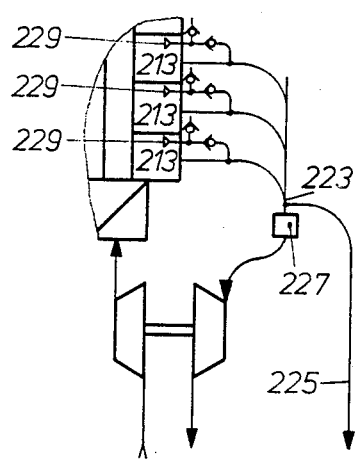
Fig. 3
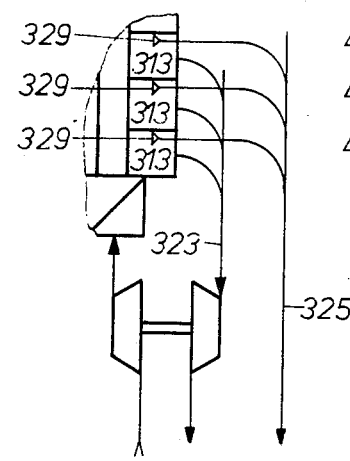
Fig. 4
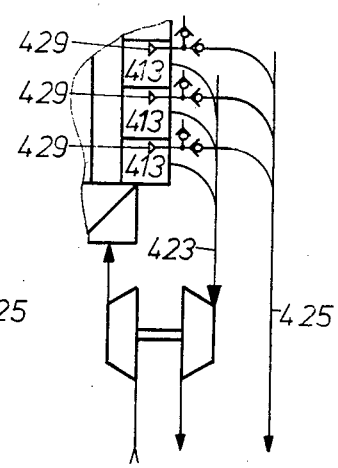
Fig. 5

TURBOCHARGED INTERNAL COMBUSTION ENGINE

The present invention relates to an internal combustion engine with several cylinders, one or several supercharging aggregates, of which each consists of an exhaust gas turbine and of a compressor, and with an additional compressor-drive by means of a pressure gas, and aims at providing charging air with a high precompression during the partial load operation of the internal combustion engine.

Various internal combustion engines with an additional compressor-drive realized by a compressed gas or by a propellant gas are known in the art, by means of which a supercharging pressure increase independent of the exhaust gas output of the internal combustion engine can be attained. The pressurized gas generation thereby takes place, for example, by an additional compressor which is driven from the crankshaft of the internal combustion engine, or the pressurized gas for the additional compressor-drive is removed from a storage tank, or a propellant gas for the additional compressor-drive is produced in an auxiliary combustion chamber by combustion of fuel. With internal combustion engines equipped in such a manner, the large expenditure for the additional structural groups for the pressurized or propellant gas generation and/or the pressurized gas storage is a disadvantage because they considerably increase the weight and structural volume of the internal combustion engine.

The described methods for the pressurized or propellant gas production additionally effect a considerable increase in the fuel consumption, whence the economy of such internal combustion engines is jeopardized.

It is therefore the aim of the present invention to provide an internal combustion engine with an additional compressor-drive by a pressurized gas, in which the aforementioned disadvantages of the prior art internal combustion engines which are equipped in such a manner are avoided.

The underlying problems are solved according to the present invention in that during partial loads of the internal combustion engine some cylinders operate as engine, and the remaining cylinders, which are operated in the meantime as compressor, supply compressed gas for the additional compressor-drive of each supercharging aggregate which supplies cylinders operating as engine with charging or supercharged air.

The solution according to the present invention can be effected with only slight expenditures in additional structural parts.

The type of pressurized gas production according to the present invention causes only a slight additional fuel consumption resulting from the used compression work, whereas the fuel is saved which would otherwise have to be spent for the friction work of a separately arranged compressor.

The advantages achieved with the present invention consist especially in that with internal combustion engines having a low compression ratio $\epsilon$, the operating behavior can be improved considerably at partial loads or the operation thereof at partial loads is only made possible thereby, in that the internal combustion engine can be supplied during partial loads with charging air of such high precompression that the emission of non-combusted hydrocarbons, so-called white smoke, which burdens the environment, does not occur, in that the slight additional structural part expenditure and slight fuel consumption permit a particularly economic exploitation of the present invention, and in that an effective increase of the charging air precompression occurs during partial loads already in the low rotational speed range.

Accordingly, it is an object of the present invention to provide an internal combustion engine which avoids by simple means the aforementioned shortcomings and drawbacks encountered in the prior art.

Another object of the present invention resides in a multi-cylinder internal combustion engine with one or several superchargers which enables an efficient supercharging of the engine also at partial loads.

A further object of the present invention resides in a supercharged multi-cylinder internal combustion engine in which supercharging is assured over the entire load range without the requirement of large expenditures, weight increases or increase of structural volume of the engine.

A further object of the present invention resides in an internal combustion engine of the type described above which assures economic supercharging also in the partial load range without an unjustifiable increase in fuel consumption.

Still another object of the present invention resides in a supercharged multi-cylinder internal combustion engine which permits a considerable improvement in the operating behavior of a low compression engine during partial load while ensuring a particularly efficient operation of the engine.

Another object of the present invention resides in a supercharged multi-cylinder internal combustion engine which improves the emission quality by extremely simple and highly efficient means, particularly also in the low rotational speed range and at partial loads.

These and other objects, features and advantages of the present invention will become more apparent from the following description when taken in connection with the accompanying drawing which shows, for purposes of illustration only, several embodiments in accordance with the present invention, and wherein:

FIG. 1 is a schematic view of an internal combustion engine with two cylinder rows in accordance with the present invention, to which one supercharging aggregate each is coordinated;

FIG. 2 is a partial schematic view of an internal combustion engine, similar to FIG. 1, in which the exhaust gas turbine of the right supercharging aggregate includes an adjustable guide apparatus;

FIGS. 3 to 5 are partial schematic views illustrating different embodiments of a multi-cylinder internal combustion engine in accordance with the present invention, and illustrating different possibilities for the compressed gas removal from the cylinders operating as compressors; and FIGS. 6 and 6A–C show schematic views of modified embodiments of an internal combustion engine in accordance with the present invention with a heating installation in the pressurized gas line thereof.

Figure 7:
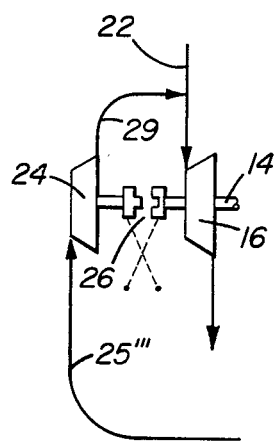
Figure 8:
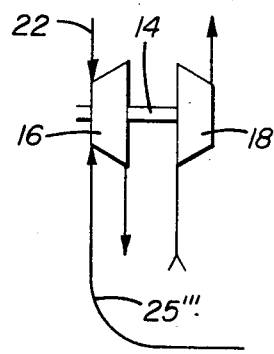
Figure 9:
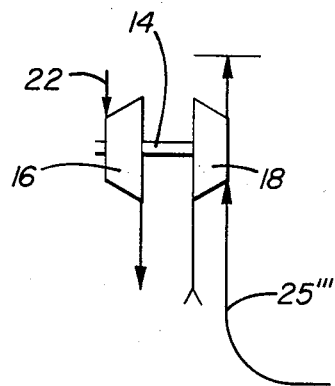

FIGS. 7 to 9 show schematic views of further embodiments of the invention.

Referring now to the drawing wherein like reference numerals are used throughout the various views to designate like parts, reference numeral 11 designates an internal combustion engine whose cylinders 12 and 13 are arranged in two cylinder rows. Each cylinder row is supplied with precompressed charging air by a respective supercharging aggregate 14 and 15, which consists each of an exhaust gas turbine 16, respectively, 17 and of a compressor 18, respectively, 19; the charging air is cooled in conventional charging air coolers 20 and 21. At partial load, only some cylinders of the internal combustion engine 11 operate as combustion engine, for example, the cylinders 12 in the left row in FIG. 1, whereas the fuel supply is cut-off for the cylinders 13 and thus the cylinders 13 are operated as compressors.

Figure 6:
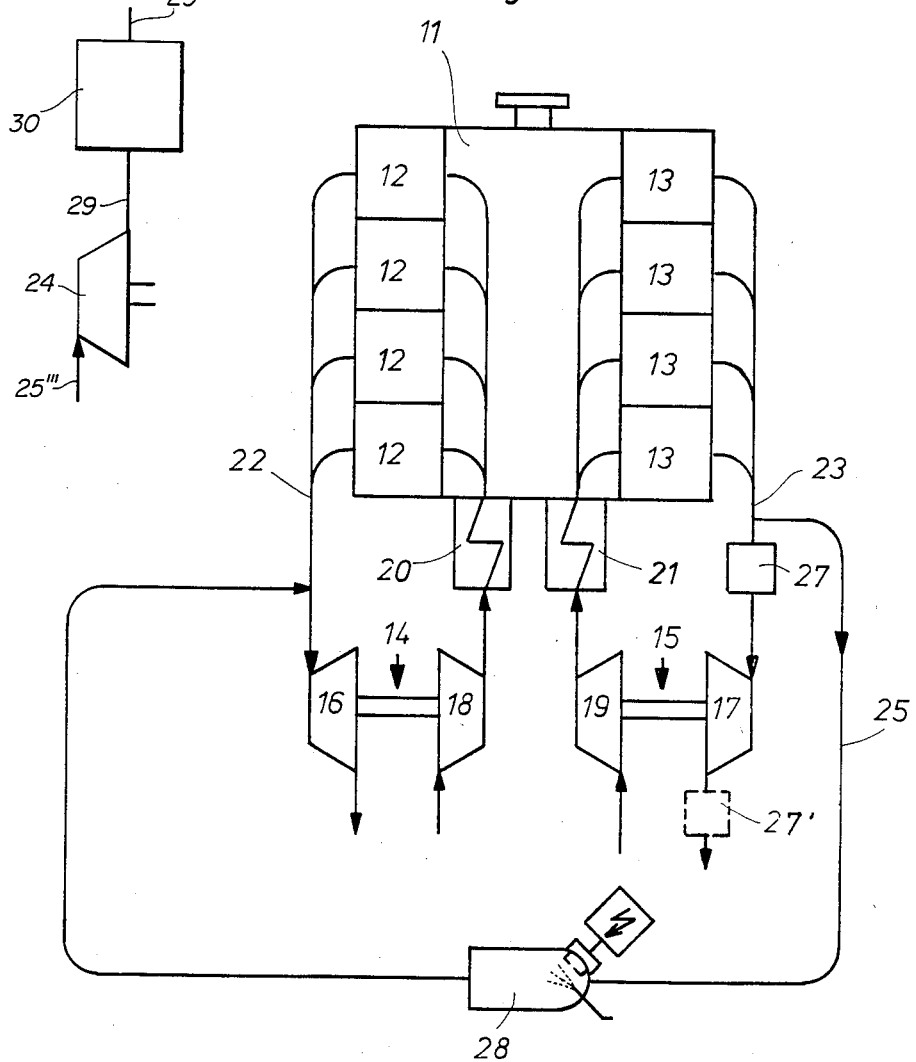

In the embodiment according to FIG. 1, respectively, according to FIG. 6, the gas exchange takes place in the cylinders 13 operated as compressor by way of the gas-exchange control elements which already exist for the engine operation. The pressurized gas from the cylinders 13, i.e., the gas which is compressed by cylinders 13, is thereby exhausted into the exhaust gas line 23 which is closed off by a device 27 and 27' of any conventional construction. A compressed or pressurized gas line 25 branches off upstream of the device 27, respectively, 27' which conducts the compressed gas out of the cylinders 13 to the supercharging aggregate 14 for use as additional driving energy for the compressor 18. Several alternative possibilities are illustrated in FIGS. 1 and 6 for the realization of the additional compressor-drive by means of the line sections 25',25", 25''' and 25'''' (FIG. 1) of the compressed gas line 25 see FIGS. 7-9.

With the line section 25', the compressed gas is supplied to the exhaust gas in the exhaust gas line 22 from the cylinders 12 operating as engine upstream of the inlet thereof into the exhaust gas turbine 16.

With the line section 25", the compressed gas is fed to a blading arranged at the rotor of the exhaust gas turbine 16.

With the line section 25''', the compressed gas is fed to a compressed gas turbine 24 coupled with the exhaust gas turbine 16. The additional compressed gas turbine 24 can thereby be coupled rigidly with the exhaust gas turbine 16 or by means of a shiftable clutch 26.

The exhaust gas from the compressed gas turbine 24 is introduced by way of line 29 into the exhaust gas line 22 of the internal combustion engine 11 whence the mass flow for the exhaust gas turbine 16 increases. A heating installation for the compressed gas is installed into the compressed gas line 25 which consists of an auxiliary combustion chamber 28 (FIG. 6), with the aid of which the energy content of the compressed gas can be increased. The extent of the additional energy supply to the compressed gas which is attainable by means of the auxiliary combustion chamber 28 is regulatable by way of the fuel quantity for the auxiliary combustion chamber 28. For example, the charging air pressure may serve thereby as control magnitude for the fuel quantity.

The heating installation may also be a heat-exchanger 28' (FIG. 6A) arranged in the line 25, by means of which a part of the heat still contained in the exhaust gases of the exhaust gas turbine 16 is transferred to the compressed gas. The possibility also exists to combine the auxiliary combustion chamber 28 and the heat-exchanger 18'. The heat-exchanger 18' would then be arranged in the line 25 upstream of the auxiliary combustion chamber 28 (FIG. 6B).

Additionally, the heating installation 30 (FIG. 6C) may also be arranged alternatively in the line 29, as a result of which the temperature of the exhaust gas of the compressed gas turbine 24 can be matched to the temperature of the internal combustion exhaust gas.

With the line section 25'''' (FIG. 9), the compressed gas is blown onto the rotor blading of the compressor 18.

FIG. 2 illustrates a modified construction of the supercharging aggregate 15 whereby corresponding reference numerals of the 100 series are used for similar parts already designated in FIG. 1. The turbine 117 is equipped with an adjustable guide apparatus 127 which in the closed condition closes off the exhaust gas line 123 and which corresponds to the device 27, 27' of FIG. 1.

FIGS. 3-5 illustrate modified constructions for the removal of the compressed gas from the cylinders 13 operating as compressor. Corresponding reference numerals of the 200, 300 and 400 series, respectively, are used in these figures to designate similar parts already described in FIG. 1.

In FIG. 3, a valve 229 for the compressed gas is provided at each cylinder 213, to which an automatic suction and pressure valve each is coordinated. In this manner, it is possible in conjunction with the gas-exchange control elements in a four-cycle engine to utilize during each crankshaft rotation a suction stroke and a pressure stroke for the production of compressed gas in the cylinders 213 operating as compressor. The compressed gas is exhausted also in this embodiment into the exhaust gas line 223 adapted to be closed off by the device 227 and is removed by way of the compressed gas line 225.

In FIG. 4, removal or bleed valves 329 serve for the exhaust of the compressed gas from the cylinders 313 operating as compressor into the compressed gas line 325 completely separate from the exhaust gas line 323.

In FIG. 5, valves 429 with one automatic suction and pressure valve each are arranged at each cylinder 413, as in FIG. 3. The gas-exchange control elements for the engine operation, however, are turned off in this embodiment for the duration of the operation of the cylinders 413 as compressors so that suction and exhaust of the compressed gas takes place solely by way of the valves 429. In the embodiments according to FIGS. 4 and 5, the exhaust gas line 323, respectively, 423 need not be closed off. The compressed gas reaches the compressed gas line 325, respectively, 425 directly from the cylinders.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A multi-cylinder internal combustion engine having first cylinders operating during partial load as a combustion engine and second cylinders operating during partial load as a compressor, comprising at least one supercharging means comprising at least one compressor means operable to supply with charging air the cylinders operating as a combustion engine, and one compressor-drive means, means for supplying impulse-energy to the one compressor drive means by the use of a compressed gas, one additional compressor-drive means, and means receiving compressed gas from said second cylinders for supplying compressed gas to the additional compressor-drive means.

2. Internal combustion engine according to claim 1, characterized in that each supercharging means consists of an exhaust gas turbine means and of a compressor means.

3. An internal combustion engine according to claim 2, wherein said additional compressor-drive means comprises
at least a compressed gas turbine means, and
means for supplying compressed gas to said compressed gas turbine means and
means for coupling said compressed gas turbine means to said one compressor-drive means.

4. An internal combustion engine according to claim 3, characterized in that the exhaust gas of the compressed gas turbine means is fed by way of a line means to the exhaust gas from the cylinder means operating as engine and a heating means is arranged in said line means.

5. An internal combustion engine according to claim 2, further comprising
means for blowing compressed gas onto rotor blade means of said one compressor means.

6. Internal combustion engine according to claim 1, further comprising
a heating means accepting the output of said additional compressor-drive means for supplying gas to the exhaust of the cylinders operating as a combustion engine.

7. An internal combustion engine according to claim 6, characterized in that the heating means includes a heat-exchanger means which utilizes the residual heat in the exhaust gas of the supercharging means which supplies the cylinder means operating as an engine with charging air.

8. An internal combustion engine according to claim 6, characterized in that
the heating means includes an auxiliary combustion chamber means and the heat-exchanger means is arranged in the compressed gas line means upstream of the auxiliary combustion chamber means.

9. An internal combustion engine according to claim 6, characterized in that the heating means includes an auxiliary combustion chamber means.

10. A multi-cylinder internal combustion engine having first cylinders operating during partial load as a combustion engine and second cylinders operating during partial load as a compressor, comprising
plural supercharging means each comprising an exhaust gas turbine means and a compressor means,
one of said compressor means operable to supply with charging air the cylinders operating as a combustion engine, and one of said exhaust gas turbine means having an inlet,
means for supplying impulse-energy to the one exhaust gas turbine means by the use of a compressed gas,
means for supplying compressed gas to exhaust gas from the cylinders operating as an engine upstream of said inlet thereof to the one exhaust gas turbine means.

11. A multi-cylinder internal combustion engine having first cylinders operating during partial load as a combustion engine and second cylinders operating during partial load as a compressor, comprising
plural supercharging means each comprising an exhaust gas turbine means and a compressor means,
one of said compressor means operable to supply with charging air the cylinders operating as a combustion engine, and one exhaust gas turbine means having a blading means,
means for supplying impulse-energy to the said one exhaust gas turbine means by the use of a compressed gas upstream of the exhaust gas inlet thereof,
means for supplying compressed gas to said blading means.

12. An internal combustion engine according to claim 1, 2, 10, 11, or 3, characterized by a heating means for an additional energy supply to the compressed gas out of the cylinder means operating as compressor means.

13. An internal combustion engine according to claim 12, characterized in that the heating means includes an auxiliary combustion chamber means.

14. An internal combustion engine according to claim 13, characterized in that the heating means includes a heat-exchanger means which utilizes the residual heat in the exhaust gas of the supercharging means which supplies the cylinder means operating as engine with charging air.

15. An internal combustion engine according to claim 14, characterized in that the heat-exchanger means is arranged in the compressed gas line means upstream of the auxiliary combustion chamber means.

16. An internal combustion engine according to claim 12, characterized in that the heating means includes a heat-exchanger means which utilizes the residual heat in the exhaust gas of the supercharging means which supplies the cylinder means operating as engine with charging air.

17. An internal combustion engine according to claim 16, characterized in that
the heating means includes an auxiliary combustion chamber means and the heat-exchanger means is arranged in the compressed gas line means upstream of the auxiliary combustion chamber means.

18. An internal combustion engine according to claim 1, 2, 10, 11, 3, 4 or 5, further comprising
means for closing off an exhaust line fed by the compressed gas from the cylinder means operating as compressor means.

19. An internal combustion engine according to claim 18, characterized by a heating means for an additional energy supply to the compressed gas out of the cylinder means operating as compressor means.

20. An internal combustion engine according to claim 19, characterized in that the heating means includes an auxiliary combustion chamber means.

21. An internal combustion engine according to claim 19, wherein the heating means comprises
a heat-exchanger means for receiving the residual heat in the exhaust gas of the supercharging means which supplies the cylinder means operating as engine with charging air.

22. An internal combustion engine according to claim 1, 2, 10, 11, 3, 4 or 5, further comprising
a separate compressed gas line means,
valve means for providing compressed gas to said separate compressed gas line means and
means for feeding compressed gas from said second cylinders into said valve means.

23. An internal combustion engine according to claim 22, characterized by a heating means for an additional energy supply to the compressed gas out of the cylinder means operating as compressor means.

24. An internal combustion engine according to claim 23, characterized in that the heating means includes an auxiliary combustion chamber means.

25. An internal combustion engine according to claim 24, wherein the heating means comprises
a heat-exchanger means for receiving the residual heat in the exhaust gas of the supercharging means which supplies the cylinder means operating as an engine with charging air.

* * * * *